US006887080B2

(12) United States Patent
Jeong

(10) Patent No.: US 6,887,080 B2
(45) Date of Patent: May 3, 2005

(54) MULTI-PURPOSE VISUAL-LANGUAGE SYSTEM BASED ON BRAILLE

(76) Inventor: Yong-Seok Jeong, 778-4 Jayang 1-dong, Kwangjin-ku, Seoul 143-191 (KR)

( * ) Notice: Subject to any disclaimer, the term of this patent is extended or adjusted under 35 U.S.C. 154(b) by 0 days.

(21) Appl. No.: 10/683,902

(22) Filed: Oct. 10, 2003

(65) Prior Publication Data

US 2004/0076932 A1 Apr. 22, 2004

Related U.S. Application Data

(63) Continuation of application No. PCT/KR02/00642, filed on Apr. 11, 2002.

(30) Foreign Application Priority Data

Apr. 12, 2001 (KR) ................................ 10-2001-0019708
Sep. 1, 2001 (KR) ................................ 10-2001-0053718

(51) Int. Cl.[7] ................................................ G09B 21/00
(52) U.S. Cl. ...................................................... 434/112
(58) Field of Search ................................ 434/112, 113, 434/114, 116

(56) References Cited

U.S. PATENT DOCUMENTS 3,628,257 A * 12/1971 Budrose ..................... 434/319
3,932,869 A * 1/1976 Kane ....................... 340/407.2
4,516,939 A * 5/1985 Crimmins, Jr. ............. 434/114
4,836,784 A 6/1989 Joachim
4,840,567 A 6/1989 Litt
5,154,614 A * 10/1992 Matsuoka et al. .......... 434/112
5,767,764 A * 6/1998 Ida .......................... 340/407.1
6,033,224 A * 3/2000 Kurzweil et al. ........... 434/112
6,351,726 B1 2/2002 Wong
6,692,255 B2 * 2/2004 Roberts et al. ............. 434/113

FOREIGN PATENT DOCUMENTS

| | | |
|---|---|---|
| JP | 1982-153325 | 9/1982 |
| JP | 05-088609 | 4/1993 |
| JP | 2001-166683 | 6/2001 |
| KR | 2001-0017729 | 3/2001 |

* cited by examiner

*Primary Examiner*—Kurt Fernstrom
(74) *Attorney, Agent, or Firm*—Knobbe Martens Olson & Bear LLP

(57) ABSTRACT

The present invention relates to a visual language to be used on the multipurpose of a information input/output at the information age, in particular, relates to a visual language based on Braille and alphabets for providing the visually handicapped with easy access method to the information and the ordinary persons with applications including various methods as well as replacement of the barcode, for inputting/outputting the previous Braille and alphabets by indicating them with color lattice, saturation lattice, brightness lattice, figure and patter and for printing out with a normal print. The present invention receives several Braille, extracts a predefined property and a value thereof corresponding to each of the several Braille cell, and indicates the extracted the value accumulatively according to a predefined way.

24 Claims, 20 Drawing Sheets

ENGLISH ALPHABET

NUMBER:THE NEXT IS INDICATED FOLLOWING THE NUMBER INDICATION

FIG. 2A

| | | |
|---|---|---|
| 0 0 0 0 | 0 | white |
| 0 0 0 1 | 1 | beige |
| 0 0 1 0 | 2 | yellow |
| 0 0 1 1 | 3 | coral |
| 0 1 0 0 | 4 | magenta |
| 0 1 0 1 | 5 | deeppink |
| 0 1 1 0 | 6 | red |
| 0 1 1 1 | 7 | silver |
| 1 0 0 0 | 8 | burlywood |
| 1 0 0 1 | 9 | cyan |
| 1 0 1 0 | 10 | springgreen |
| 1 0 1 1 | 11 | green |
| 1 1 0 0 | 12 | deakcyan |
| 1 1 0 1 | 13 | blue |
| 1 1 1 0 | 14 | midnightblue |
| 1 1 1 1 | 15 | black |

MULTI-PURPOSE VISUAL-LANGUAGE SYSTEM BASED ON BRAILLE

RELATED APPLICATIONS

This application is a continuation application, and claims the benefit under 35 U.S.C. §§ 120 and 365 of PCT Application No. PCT/KR02/00642, filed on Apr. 11, 2002 and published on Nov. 21, 2002, in English, which is hereby incorporated by reference.

BACKGROUND OF THE INVENTION

1. Field of the Invention

The present invention relates to a visual language and a visual language system. Particularly, the present invention relates to a multipurpose visual language system based on the Braille(raised letter) for the visually handicapped and multipurpose application across the whole industry.

The present invention also relates to new visual language extended raised letter system, and particularly the extended raised letters and its relevant system which are able to indicate the previous raised letters multi-dimensionally with color, figure and pattern, to combine characters with syllable cluster, to allow common person to use multipurposely by printing out, and to allow the visually handicapped to interpret the writing by a reading apparatus and a book printed in a visual language having the same volume as the one for ordinary persons. Furthermore, the rate of interpretation of the extended raised letters and its relevant system is excellent.

2. Description of the Related Art

In the case of the present raised letters, since they are linearly arranged, the printed amount thereof is much large. Also, due to many simplified characters, it is difficult to learn the raised letters. The multi-dimension concept of the visual language extended raised letters allows any languages to be clustered. The real-time portable translator makes the extended raised letters to be linearly arranged on an input/output unit, and the reading apparatus used by the ordinary persons indicates them as character. Therefore, the visual language is regarded as meta-language for identifying the raised letters and common characters optically.

FIG. 3 shows a structure of the raised letter input/output unit according to the prior art.

A raised letters indication unit can be selectively set up as one of the input, output and input/output states. This unit consists of a portable storing unit, an input/output unit, a memory, an optical translating unit (reading) and an input keyboard.

Referring to FIG. 3, the raised letter input/output unit has legs on both sides because of bi-direction, and there are fixed, attached and folded input/output units.

There is a column sensor to grasp the input/output location at the upper of the raised letters input/output unit.

The raised letter input/output unit consists of the raised letters sensing part capable of understanding the stored contents of 6 sections of 3×2 array.

FIG. 4 shows another structure of the raised letters' input/output unit according to the prior art.

Referring to FIG. 4., each part 401 corresponding to the 6 lattices comprising one raised letters consists of the upper part like the structure 1 and the lower part like the structure 2.

The upper part consists of an electromagnet 403, a magnetic substance 407 and a frog 405.

The lower part consists of an electromagnet 409, a magnetic substance 413 and a frog 411.

The upper and lower parts read the information stored in the lattices by the principle of the frog motion tactually recognizing the dots. And the translation information of the 6 lattices of one raised letter is combined and then the raised letter information as shown in FIG. 1A outputted.

FIG. 5 shows a structure of the raised letter input keyboard according to the prior art.

Referring to FIG. 5, the raised letter input keyboard 501 consists of an end key 503, a forward/backward key 505, an input/output key 507, a direction key 509, a function key 511, an information input per lattice key 513, an input completion key 515 and a space bar key 517.

If the end key 503 is twice pressed, the raised letters input work is completed.

If the forward/backward key 505 is pressed, the input of the raised letter is progressed in the forward or backward. For example, when the raised letter input is set up in the forward, if the forward/backward key 505 is pressed and then the raised letters is inputted, the input of the raised letter is progressed backward.

If the input/output key 507 is pressed when the raised letter input is set up, the inputted raised letter contents are printed out. And if the input/output key 507 is again pressed when the raised letter output is set up, the conversion into the raised letter input mode is made.

If the input/output key 507 and the end key 503 is together pressed, the raised letters pressed by the input unit is being inputted and at once printed out.

If the direction key 509 is pressed, the movements of the lattice comprising the raised letter are from the upper to the lower and from the left to the right are made.

The function key 511 supplies several functions regarding the raised letter input.

The information input per lattice key 513 consists of number one to six, and if the information input per lattice key 513 is pressed, the information on the corresponding lattice is inputted.

If the information on the lattice is inputted and the input completion key 515 is pressed by using the information input per lattice key 513, the contents about each lattice is inputted. That is, if the input completion key 515 is pressed, the input of one raised letter is completed.

If the space bar key 517 is pressed, space between the raised letters is created.

Generally speaking, the ordinary persons don't know the inconvenience of the raised letters in that they are made in consideration for the visually handicapped. The raised letters is sole possession of the visually handicapped in that most of the ordinary persons cannot read nor write them, and also their usages are limited to the visually handicapped except for the persons who are interested therein. If a book would be translated to the letters, the translated book will be tens of time larger than the original one and the cost for printing the translated book will be considerably increased.

SUMMARY OF CERTAIN INVENTIVE ASPECTS OF THE INVENTION

One aspect of the present invention extends the previous raised letters with lattice images, figures, and patterns having color easy to be optically translated. Then the extended raised letters is printed out with a common printer and translated by the reading apparatus. Due to the characteristics of the visual language, it is easy to convert a text read by the ordinary persons to the raised letters read by the visually handicapped.

One aspect of the present invention is to provide the multipurpose visual language system based on the raised letters for the visually handicapped and the application to the whole industry by making new visual language extended raised letters and its system.

It is difficult for the ordinary persons to read and write the present raised letters in that they are made in consideration for the visually handicapped, and in case that the raised letters are optically read, the speed and accuracy of the reading is decreased in that they are composed of points and linearly arranged. Another aspect of the present invention is to provide the multipurpose visual language system based on the raised letters having the form of syllable cluster and the easiness to be optically read.

Another aspect of the present invention is to provide the multipurpose visual language system based on the raised letters having the compressibility of N to 1, one to one correspondence to common character, the multi-dimension concepts and the ability of clustering according to any standard.

Another aspect of the present invention is to provide the multipurpose visual language system based on the raised letters having the advantage of storage and print as middle language.

Another aspect of the present invention is to provide the multipurpose visual language system based on the raised letters having the ability of the infinite storage of information and of replacing the previous barcode with the visual language. At present, due to the cost, the raised letters are not indicated on medicines and foodstuffs. If this new visual language would be indicated thereon, the logistic maintenance can be achieved in the face of industry and the visually handicapped can understand the contents of the visual language by a visual language translator. Furthermore, the ordinary persons can understand the contents with the visual language translator as do with a barcode reading apparatus. Since the visual language is based on the previous raised letters, the previous raised letters, of course, can be indicated and the accuracy of bi-directional translation (common character <–> raised letter) can be achieved by internally using the visual language. The ordinary persons can communicate with the visually handicapped by inputting a text and printing the text and the visual language.

Furthermore, another aspect of the present invention is to provide the multipurpose visual language system based on the raised letters allowing the visually handicapped to effectively access all information on the industry with the new visual language and system.

The visual language can achieve the variety of applications to industry fields, one to one correspondence to the previous language as the extended language. Also, the visual language allows the visually handicapped to be benefited by using the multi-dimension and cluster concepts and all the mankind to be benefited by using the visual language as common language. Also, the visual language is easy to be bi-directionally transformed as meta-language of the general language and the raised letter and optically read.

The printed matter, CD, electronic book and so on made with the visual language of the present invention can include the color correction and the standard information to be the standard when reading the visual language indicated as content. The color table of the visual language as the color correction and the standard information is included on the front or the back of the print matter, CD, electronic book and so on. The color table of the visual language (the color correction and the standard information) is provided to correctly read the visual language information different in time, lighting and the color and the quality of the material of the printed paper.

Also, new input/output unit is portable and can be used as input unit and as output unit, and also can be simultaneously used as input and output units. Also, to correct misspelling in inputting and to edit are allowable.

In order to decide whether the contents inputted in the visual language is correct, it is possible to indicate the visual language and other language together. For example, by indicating the general language at the bottom of the visual language, the simple decision of the misspelling and correction of the visual language are achieved. Furthermore, by indicating the raised letters at the bottom of the visual language, the visually handicapped can easily decide whether the inputted visual language is correct. Also, by providing the visual language and the sounds, the weak-eyed and the aurally handicapped can decide whether the inputted visual language is correct. In this case, the sounds are automatically created and provided corresponding to the contents inputted by a sound transformation program included within the visual language input unit.

In case of the raised letters, the reading is conducted from the left to the right, the writing is conducted from the right to the left and the input/output unit is bi-directional and therefore the input/output unit reads from the left of the upper plate to the right in the reading mode and writes from the right of the lower plate to the left in the writing mode. In the reading/writing mode, to conduct the reading and writing together is possible, but to correct is impossible. If there is any need of the confirmation of the input and the correction, the confirmation and the correction could be conducted after changing the mode to the input mode. When the main work is to input, the confirmation of the input and editing can be conducted from the left to the right with the forward/backward key.

Another aspect of the present invention provides a method for indicating raised letters with visual information to be visually classified, comprising the steps of receiving at least one raised letter, extracting a predefined property and a value thereof corresponding to the at least one raised letter and indicating the value of the extracted property and an apparatus corresponding thereto are provided.

The property is at least one among color, saturation, brightness, pattern and figure.

The visual information is indicated as the at least one property or the orthogonal overlapping or combination of the at least two properties. Here, the orthogonal overlapping means that two and over property values maintain each property value and are accumulated, and each property value can be extracted from the accumulated information. Also, the combination is indicated as new property value, which is created with the accumulated two and over property value.

For example, imagine that there is an alphabet indication system that properties corresponding to the initial, medial and final consonants of the Korean alphabet use the visual information of each color, brightness and saturation. In this case, each character of the Korean alphabets can be indicated with the visual information including a color value, a brightness value and a saturation value. And, by extracting the initial consonant corresponding to the color value, the medial consonant corresponding to the brightness and the final consonant corresponding to the saturation value from the visual information, reading of the alphabet with the visual information is possible.

Another aspect of the present invention provides a method for indicating an alphabet with visual information to be visually classified, comprising the steps of receiving at least one alphabet, extracting a predefined property and a value thereof corresponding to the at least one alphabet, and indicating the value of the extracted property and an apparatus corresponding thereto are provided.

The property is at least one among color, saturation, brightness, pattern and figure.

The visual information is indicated as the at least one property or the orthogonal overlapping or combination of the at least two properties.

Another aspect of the present invention provides a method for reading raised letters from information to be visually classified, comprising the steps of receiving at least one information visually classified, wherein the information visually classified is hereafter called as the visual information, extracting at least one property included in the at least one visual information and a value thereof corresponding to each visual information, and extracting the raised letters corresponding to the value according to a predefined rule and an apparatus corresponding thereto.

The property is at least one among color, saturation, brightness, pattern and figure.

The visual information is indicated as the at least one property or the orthogonal overlapping or combination of the at least two properties.

Another aspect of the present invention provides a method for reading an alphabet from the information to be visually classified, comprising the steps of receiving at least one information to be visually classified, wherein the information visually classified is hereafter called as the visual information, extracting at least one property included in the at least one visual information and a value thereof corresponding to each visual information. and extracting the alphabet corresponding to the value according to a predefined way and an apparatus corresponding thereto.

The property is at least one among color, saturation, brightness, pattern and figure.

The visual information is indicated as the at least one property or the orthogonal overlapping or combination of the at least two properties.

Another aspect of the present invention provides a method for indicating several raised letters with a visual information, comprising the steps of receiving several raised letters, extracting a predefined property and a value thereof corresponding to each of the several raised letters, and indicating the extracted value accumulatively according to a predefined way and an apparatus corresponding thereto.

The visual information includes at least one dimension corresponding to the raised letters.

The visual information is indicated in the form of either linear arrangement or syllable clustering corresponding to the dimension.

The property is at least one among color, saturation, brightness, pattern and figure.

The visual information is indicated as the at least one property or the orthogonal overlapping or combination of the at least two properties.

Another aspect of the present invention provides a method for indicating an alphabet with visual information, comprising the steps of receiving the alphabet, extracting a predefined property and a value thereof corresponding to each of several phoneme of the alphabet, and indicating the value of the extracted properties accumulatively according to a predefined way and an apparatus corresponding thereto.

The visual information includes at least one dimension corresponding to the raised letters.

The visual information is indicated in the form of either linear arrangement or syllable clustering corresponding to the dimension.

The property is at least one among color, saturation, brightness, pattern and figure.

The visual information is indicated as the at least one property or the orthogonal overlapping or combination of the at least two properties.

Still another aspect of the present invention provides a method for reading raised letters from information to be visually classified, comprising the steps of receiving at least one information to be visually classified, wherein several property values are accumulated in the information to be visually classified according to a predefined way, the information to be visually classified is hereafter called as the visual information, extracting a property and a value thereof corresponding to the at least one visual information, and extracting the raised letters corresponding to the value according a predefined way and an apparatus corresponding thereto.

The visual information includes at least one dimension corresponding to the raised letters.

The visual information is indicated in the form of either linear arrangement or syllable clustering corresponding to the dimension.

The property is at least one among color, saturation, brightness, pattern and figure.

The visual information is indicated with the at least one property or the orthogonal overlapping or combination of the at least two properties.

Still another aspect of the present invention provides a method for reading an alphabet from information visually classified, comprising the steps of receiving at least one information to be visually classified, wherein several property values are accumulated in the information to be visually classified according to a predefined way, the information to be visually classified is hereafter called as the visual information, extracting a property and a value thereof corresponding to the at least one visual information, and extracting the alphabet corresponding to the value according a predefined way and printing out and an apparatus corresponding thereto.

The visual information includes at least one dimension corresponding to the raised letters.

The visual information is indicated in the form of either linear arrangement or syllable clustering corresponding to the dimension.

The property is at least one among color, saturation, brightness, pattern and figure.

The visual information is indicated as the at least one property or the orthogonal overlapping or combination of the at least two properties.

Still another aspect of the present invention provides a method for transforming raised letters into information to be visually classified and storing the information, comprising the steps of receiving at least one raised letter, extracting a predefined property and a value thereof corresponding to the at least one raised letter, and storing the extracted value and an apparatus corresponding thereto.

Still another aspect of the present invention provides a method for transforming an alphabet into information to be visually classified and storing the information, comprising the steps of receiving at least one alphabet, extracting a predefined property and a value thereof corresponding to the at least one alphabet, and storing the extracted value and an apparatus corresponding thereto.

Yet another aspect of the present invention provides a method for transforming several raised letters into information to be visually classified and storing the information, comprising the steps of receiving several raised letters, extracting a predefined property and a value thereof corresponding to each of the several raised letters, accumulating the several extracted values according to a predefined way, and storing the accumulated visual information and an apparatus corresponding thereto.

Yet another aspect of the present invention provides a method for transforming an alphabet into information to be visually classified and storing the information, wherein the alphabet consists of several phonemes, comprising the steps of receiving the alphabet, extracting a predefined property and a value thereof corresponding to each of the several phonemes, accumulating the several extracted values according to a predefined way, and storing the accumulated visual information and an apparatus corresponding thereto.

BRIEF DESCRIPTION OF THE DRAWINGS

FIG. 2A shows an illustrated view of the visual language's 4-dimension usage color table according the preferable embodiment of the present invention;

DETAILED DESCRIPTION OF CERTAIN EMBODIMENTS OF THE INVENTION

Embodiments of the present invention will now be described, by way of example, and with reference to the accompanying drawings.

A raised letter indication unit can be selectively set up as one of the input, output and input/output states. This unit consists of a portable storing unit, an input/output unit, an optical translating unit (reading) and an input keyboard.

The inside storage can be made in the previous raised letter and the indications of a image display unit in printing can be given in color lattices, saturation lattices, brightness lattices, figures and patterns. The ordinary persons can read the character into which the visual language was transformed if the input/output display unit is replaced with the one for the ordinary persons or the input/output display unit for the ordinary persons is simultaneously connected thereto.

Figure 1A:
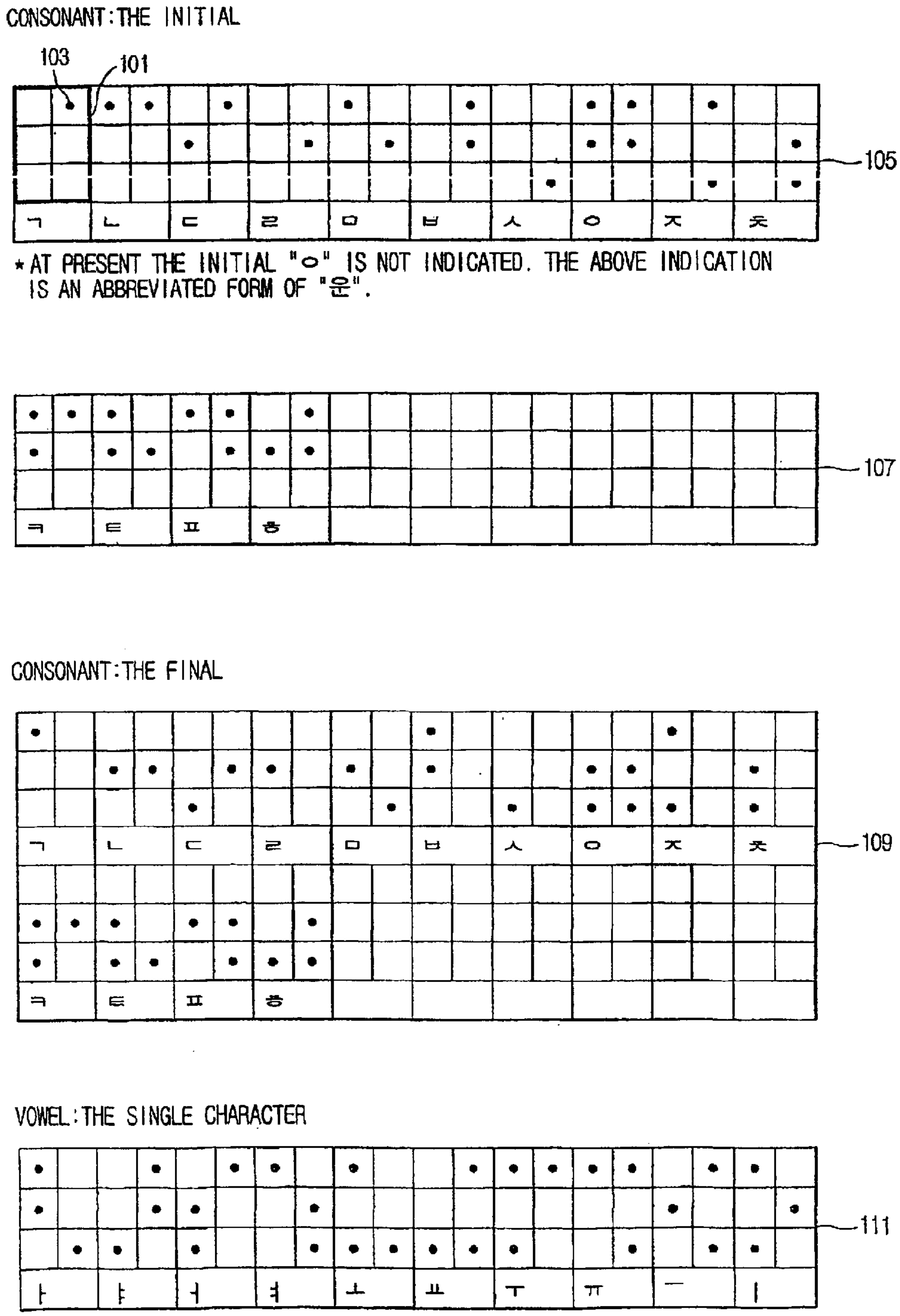
FIGS. 1A and 1B show indications of the raised letters according to the prior art.
Figure 1B:
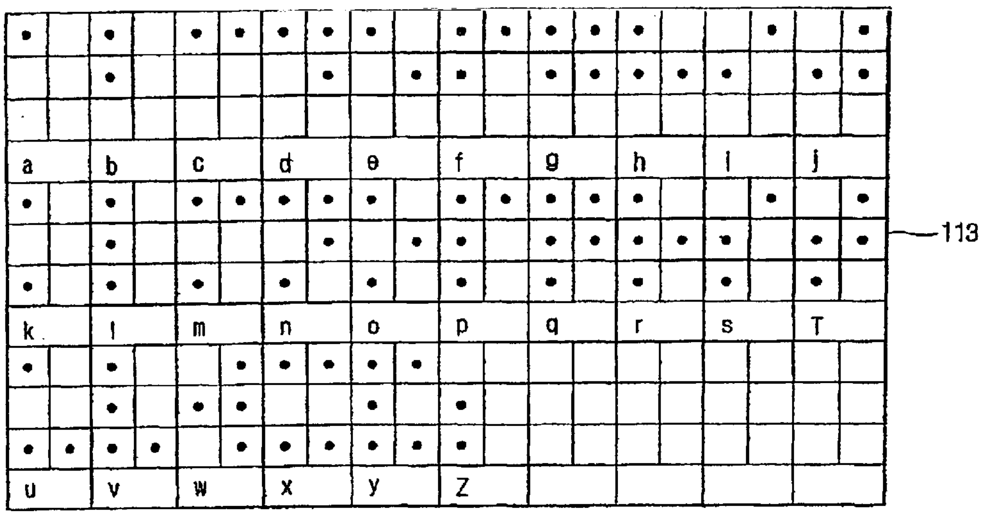
Figure 1B:
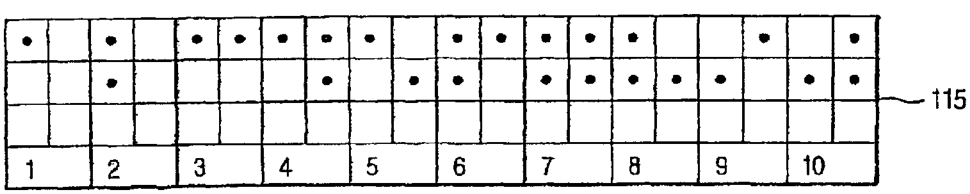
Figure 1C:
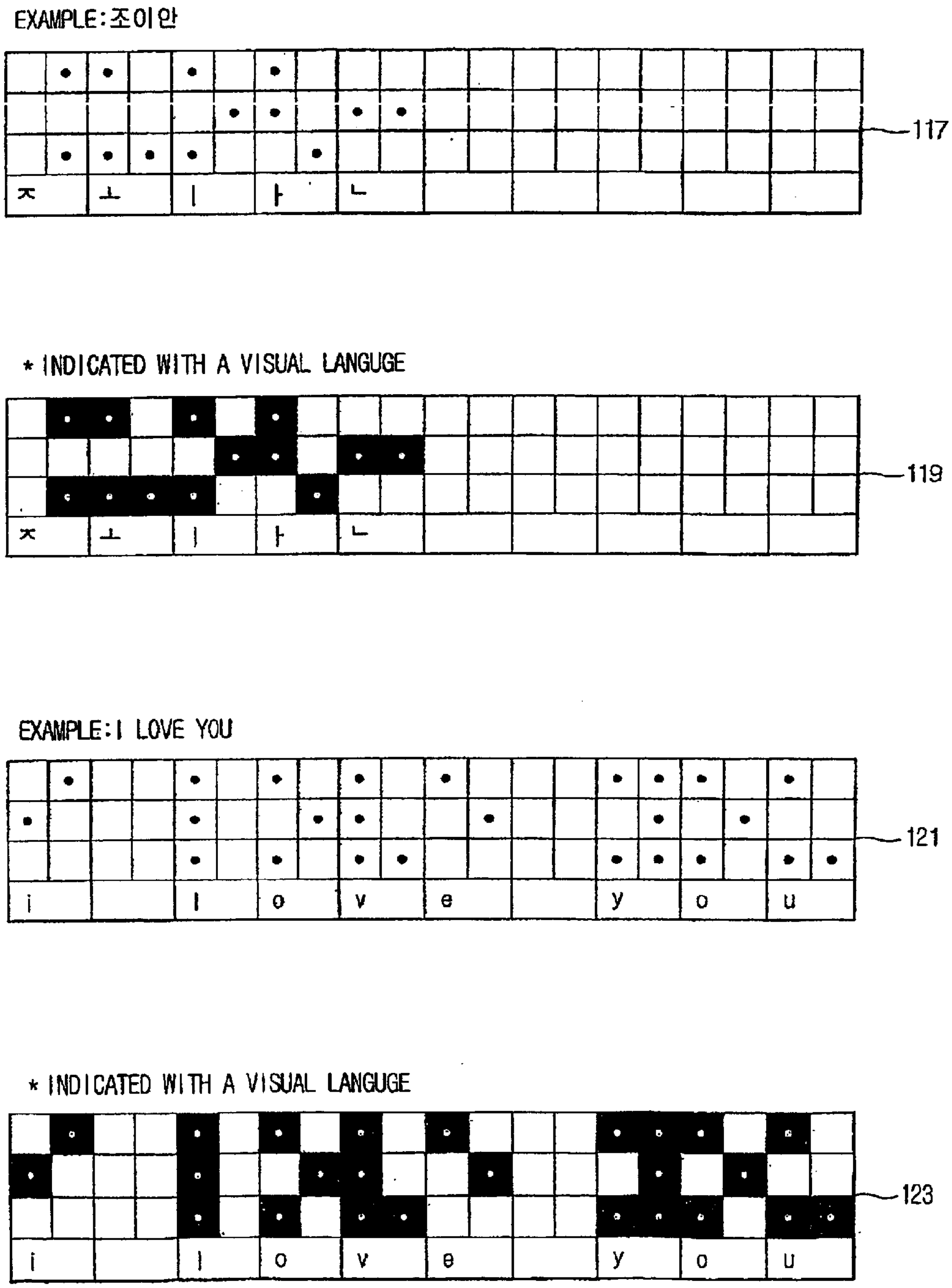
FIG. 1C shows an illustrated view of indicating the raised letters with the visual language's linear arrangement according the preferable embodiment of the present invention.

FIG. 1C shows an illustrated view of indicating a raised letter with the visual language's linear arrangement according the preferable embodiment of the present invention.

Referring to FIG. 1C, being classified with two color of black and white, the indication of the raised letters can be given. In such way, the visual language can be linearly arranged by the 6 sections of the raised letters system with white and black colors.

For example, '조이안' can be linearly arranged in vowel and consonant such as 'ㅈ', 'ㅗ', 'ㅣ', 'ㅏ', 'ㄴ', and each of the vowels and the consonants can be indicated in the raised letters 117. Each section consisting of the raised letters is indicated in the visual language 119 with black and white colors.

For another example, alphabet characters and spaces comprised of a composition 'i love you' can be indicated with the raised letters 121. And if the raised letters are indicated with black and white colors, the composition can be indicated with the visual language 123 indicated with black and white colors.

Figure 2B:
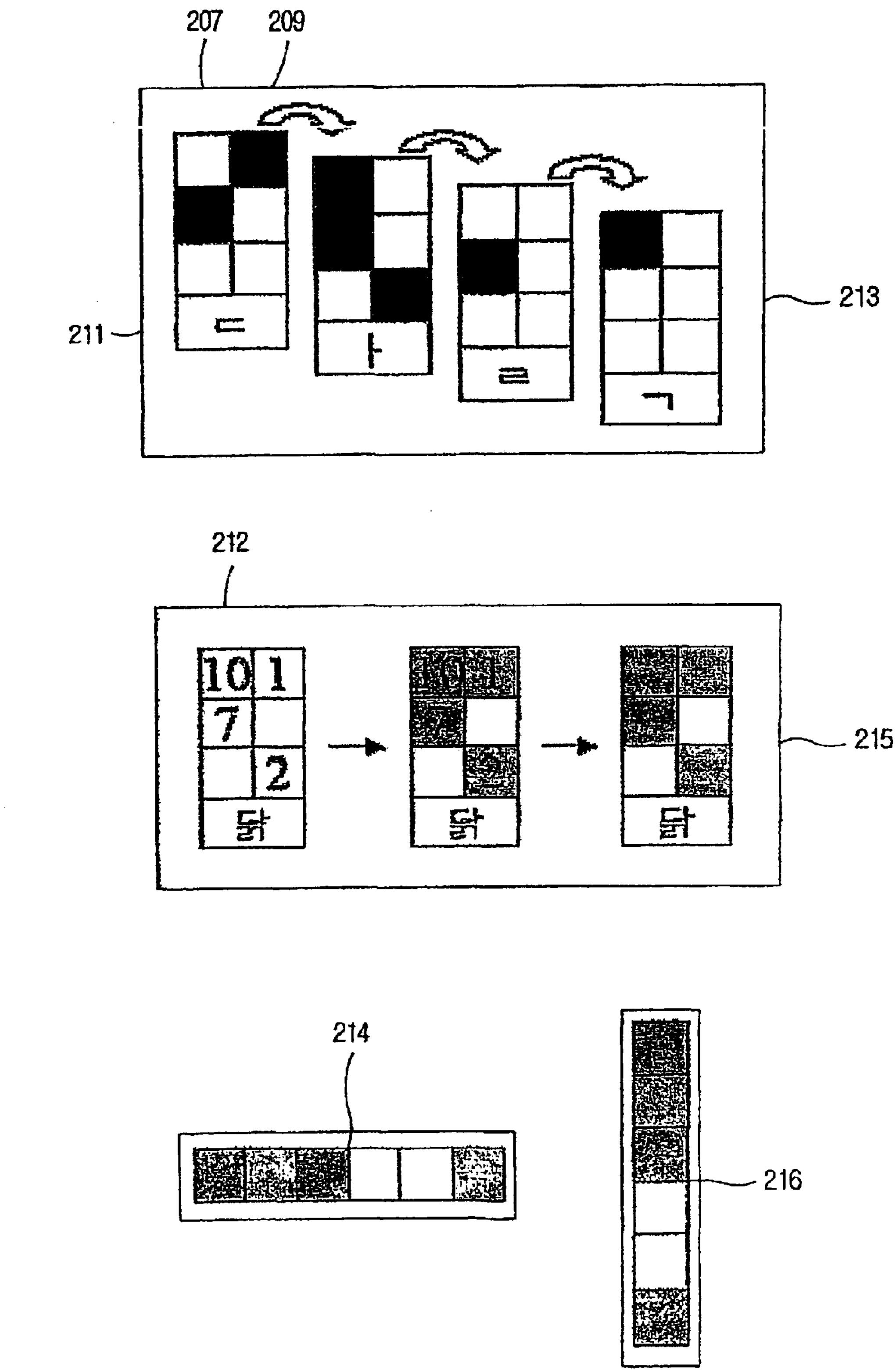
FIGS. 2B and 2C show illustrated views of the indications of the visual language's syllable clustering to which the multi-dimension concept and the color lattice were applied according the preferable embodiment of the present invention.
Figure 2C:
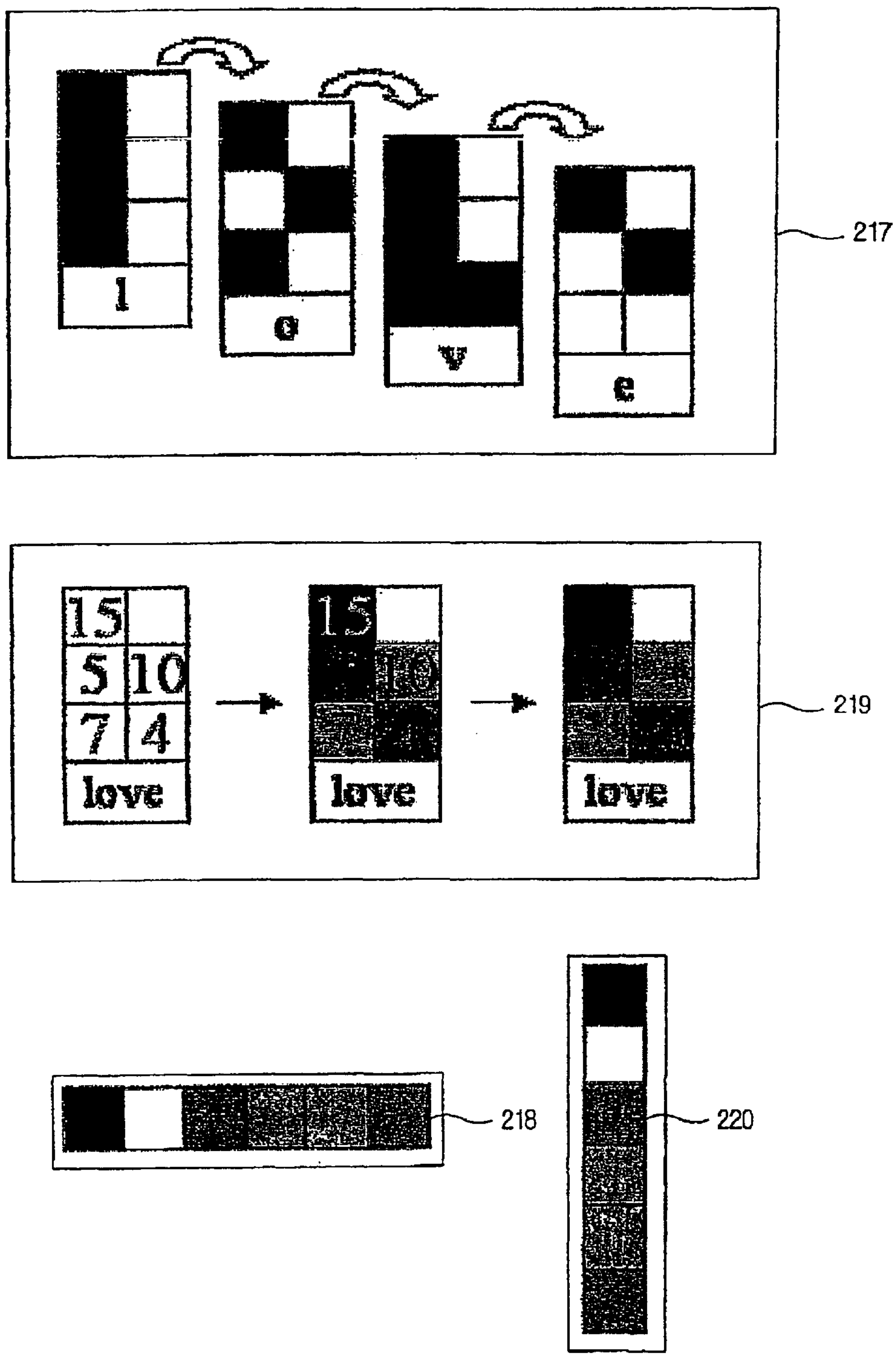
Figure 3:
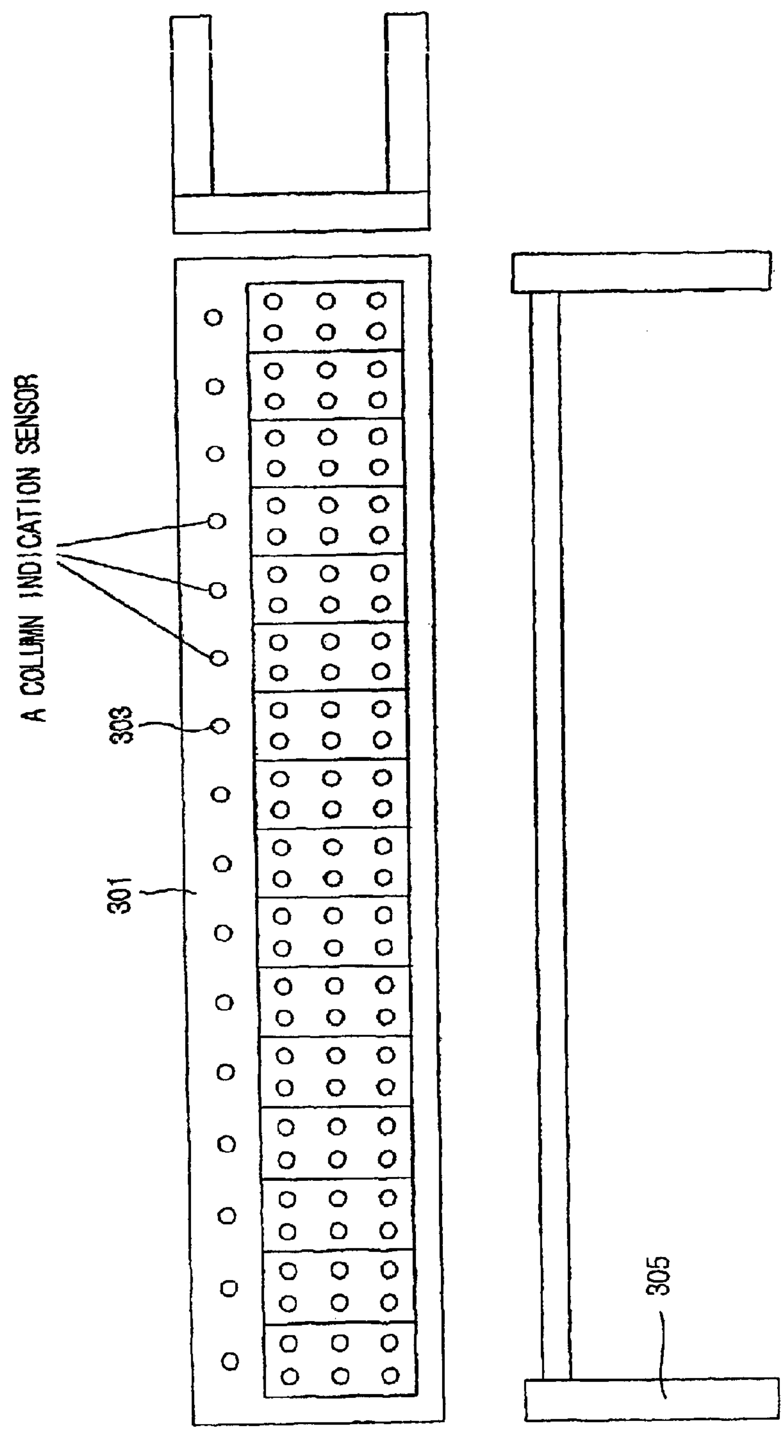
FIG. 3 shows a structure of a raised letter's input/output unit according to the prior art.
Figure 4:
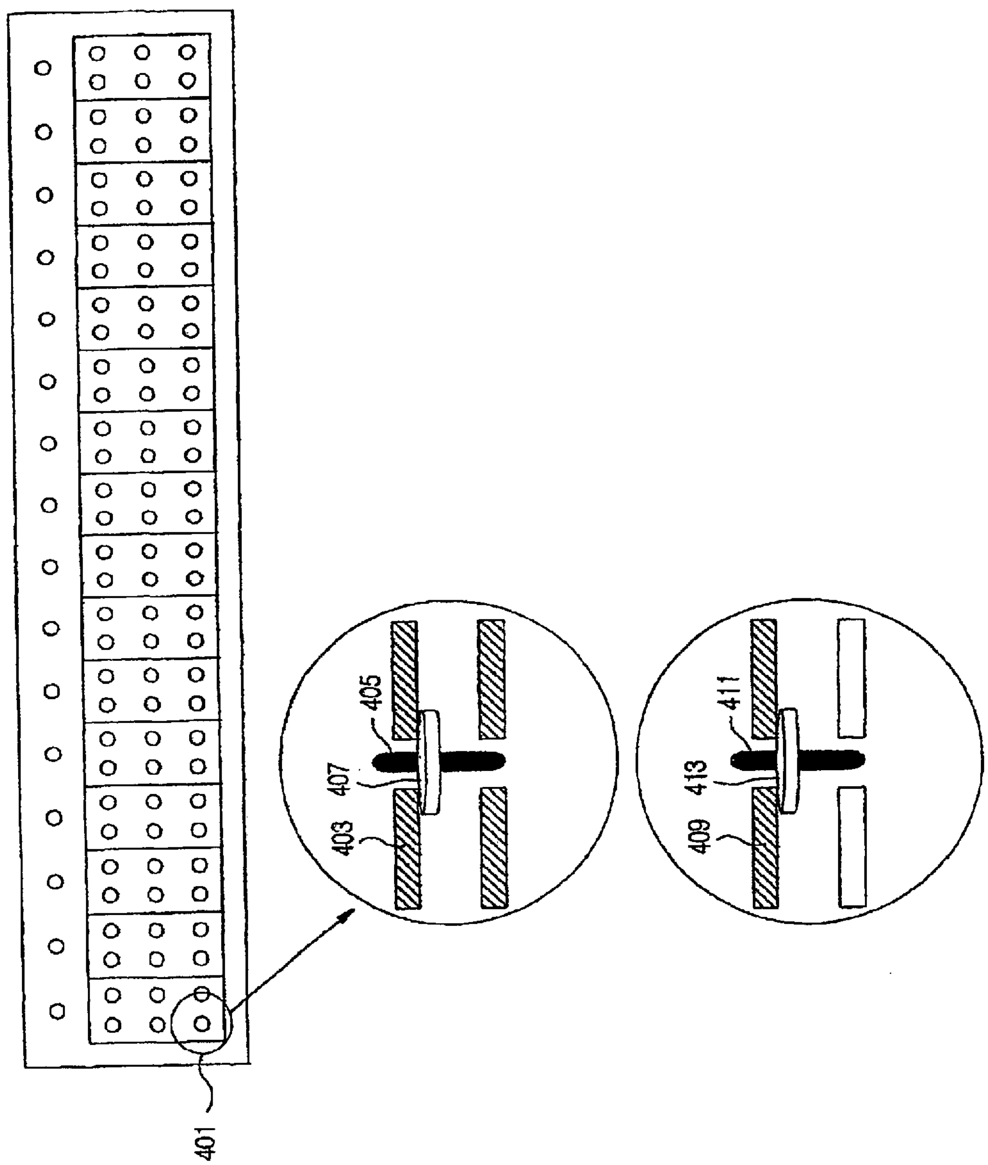
FIG. 4 shows another structure of a raised letter's input/output unit according to the prior art.
Figure 5:
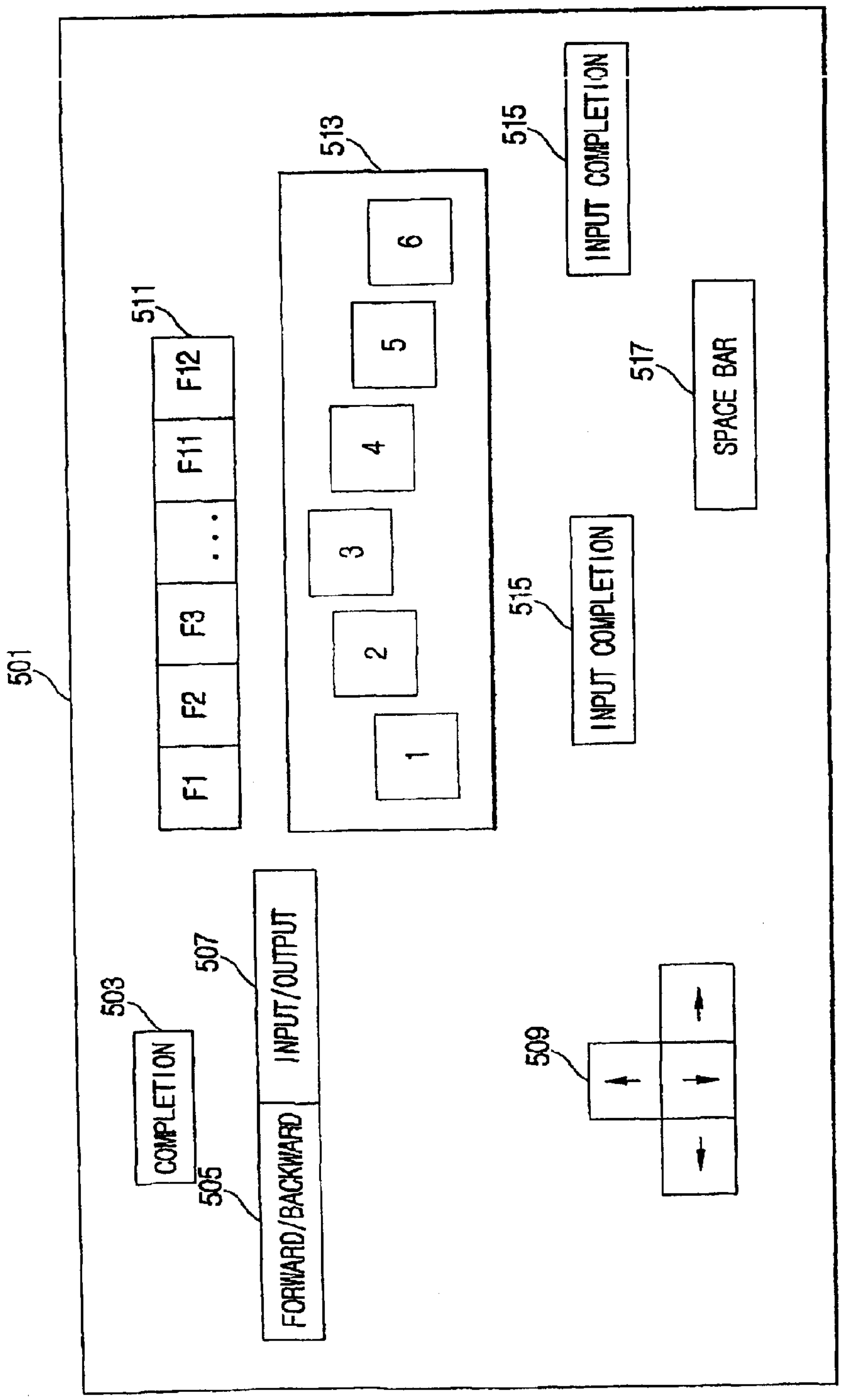
FIG. 5 shows a structure of a raised letter's input keyboard according to the prior art.

The visual language 123 indicated with black and white colors can be linearly arranged in one row (1×n) or in one column (n×1) as shown in FIGS. 2B and 2C.

As shown in FIG. 1C, a white point which is empty of a color in the center of each lattice filled with the color is a center point representing the center of each lattice. If the entire lattice is filled with the color without the center point, when several lattices are filled with the color, it is difficult to read the visual language 123 lattice indicated with black and white colors since the boundaries between the lattices cannot easily be identified. However, with the center points, the visual language can be quickly and correctly read since the visual language translating unit can the upper and lower colors on the basis of the center points. The center points are center points or center lines notifying the lattice's location.

FIG. 2A shows an illustrated view of a visual language's 4-dimension usage color table according the preferable embodiment of the present invention.

Referring to FIG. 2A, each of the values 0 to 15 of the visual language which is applicable to the 4-dimension based visual language, is endowed with a characteristic color and in advance set up. Here the dimension or the color value can be differently set up.

For example, the value of the visual language corresponding to a 4-dimension value '0000' is '0', and the corresponding color can in advance be set up with white. Furthermore, the value of the visual language corresponding to a 4-dimension value '1010' is '10', and the corresponding color can in advance be set up with 'spring green'

The values of the visual language corresponding to the 4-dimension value are determined according to the below equation.

$$0000=0*2^3+0*2^2+0*2^1+0*2^0=0+0+0+0=0$$

$$1010=1*2^3+0*2^2+1*2^1+0*2^0=8+0+2+0=10$$

The way to create a 4-dimension value from the 4 phonemes comprising a character based on the raised letters is disclosed in FIG. 2B.

FIGS. 2B and 2C show illustrated views of a indication of the visual language's syllable clustering to which the multi-dimension concept and the color lattice were applied according the preferable embodiment of the present invention.

Referring to FIGS. 2B and 2C, the raised letters in the linear arrangement can be indicated as the visual language to which syllable clustering and the multi-dimension concept is applied.

A visual language is indicated as color lattice, saturation lattice, brightness lattice, pattern and figure on a terminal display unit or a printed material and written and stored as number of 'dimension+location+a value of the visual language' in the file or the database. And the color table of the visual language is indicated and printed in the beginning of the terminal display unit or the printed material corresponding to the visual language.

The dimension is a value about the number of the phonemes indicated as one visual language unit, the location is row and column of the section included in the visual language unit. Also, the value of the visual language is the value corresponding to the 4-dimension value (for example, the value of the visual language is at least one of 0 to 15 in FIG. 2).

Here, the dimension can be transformed according to the resolution and the performance of the visual language translation of the visual language translating unit. For example, when the number of the color translated by the visual language translating unit A is low, information could be indicated or translated in the lower n-dimension visual language. However, in case of another visual language translating unit B having better color translation performance, the information could be transformed into a higher n+α-dimension visual language and indicated or translated. That is, the visual language could be transformed into various dimensions according to the performance of the visual language translating unit, and needed translation information of dimension information and array displaying form can be printed together as visual language and provided, if needed.

The combination of one and more character can be indicated in n×m array, wherein n is one and over and m is one and over. For example, when a character '닭' is indicated as syllable clustering, it can be indicated as 3×2 array like 215, as 1×6 array like 214 or as 6×1 array like 216. That is, one visual language can be indicated as a line such as a row (1×n) or a column (n×1).

By arranging each lattice corresponding to the rows and columns of the (1,1), (1,2), (2,1), (2,2), (3,1), (3,2) of the 3×2 array like the constitution of the previous raised letters at column 1, 2, 3, 4, 5, 6 of row 1, the visual language of 1×6 array 214 can be created. Also, By arranging each lattice corresponding to the rows and columns of the (1,1), (1,2), (2,1), (2,2), (3,1), (3,2) of the 3×2 array like the constitution of the previous raised letters at row 1, 2, 3, 4, 5, 6 of column 1, the visual language of 6×1 array 216 can be created.

Example 1 below is an example of the syllable clustering visual language of the initial, medial and final sounds of the Korean alphabet, and example 2 is an example of the syllable clustering visual language of the English alphabet.

EXAMPLES

Example 1닭

The character '닭' is linearly arranged as 'ㄷ' 211, 'ㅏ', 'ㄹ', and 'ㄱ' in the form of the initial, medial and final sounds of the Korean alphabet.

Each of the 'ㄷ', 'ㅏ', 'ㄹ', and 'ㄱ' is transformed into the raised letters (referring to FIG. 1A), and then is indicated in the color lattices of the raised letters having the form of the linear arrangement indicated with the black lattices 209 or the white lattices 207 like FIG. 1B. Here, the color lattices of the raised letters indicate one phoneme by using the 6 lattices of 3×2 array based on the raised letters.

By combining the 4 phonemes of 'ㄷ', 'ㅏ', 'ㄹ', and 'ㄱ', the character can be indicated as one visual language 213 of the 4-dimension linear arrangement. The color lattice, which is indicated at the same location of each of the 4 phonemes, is in reverse order translated. If the color lattice is white, '0' is endowed and if black, '1' is endowed. Here, the reverse order means that the 4 color lattices positioned at the same location are read from the right to the left.

In such way, when the character '닭' is indicated in the visual language, the 4-dimension value corresponding to the lattice 212 consisting of the visual language, the visual language value corresponding to the 4-dimension value and the color value (referring to FIG. 2A) are calculated as shown below and indicated 215.

Row 1 column 1: 1010, 10, spring green

Row 1 column 2: 0001, 1, beige

Row 2 column 1: 0111, 7, silver

Row 2 column 2: 0000, 0, white

Row 3 column 1: 0000, 0, white

Row 3 column 2: 0010, 2, yellow

If the calculated color is indicated at each location, the 4 phonemes can be indicated in one visual language. The 3×2 syllable clustering visual language information 215 can be transformed into various visual languages like 1×6 array 214 and 6×1 array 216.

Considering another example referring to FIG. 2C, the word combination of one and over can be indicated as n×m array, wherein n is one and over, and m is one and over. For example, in case that a word 'love' is indicated in the syllable clustering visual language, it can be indicated in 3×2 array 219, in 1×6 array 218, and 6×1 array 220. And to transform the 3×2 visual language into 1×6 or 6×1 visual language is the same as been disclosed in FIG. 2B.

Example 2

Love

Love consists of 'l', 'o', 'v', 'e'.

Each of the 'l', 'o', 'v', 'e' is transformed like example 1 and then is indicated in the color lattice 217 of the raised letters having black and white indications and the form of the linear arrangement as shown in FIG. 1B.

By combining the 4 phonemes of 'l', 'o', 'v', and 'e', the word can be indicated as one visual language 219 of the 4-dimension linear arrangement.

According to the same method of example 1, when the word 'love' is indicated in the visual language, the 4-dimension value corresponding to the lattice consisting of the visual language, the visual language value corresponding to the 4-dimension value and the color value referring to FIG. 2A are calculated as shown below.

Row 1 column 1: 1111, 15, black

Row 1 column 2: 0000, 0, white

Row 2 column 1: 0101, 5, deep pink

Row 2 column 2: 1010, 10, spring green

Row 3 column 1: 0111, 7, silver

Row 3 column 2: 0100, 4, magenta

If the calculated color is indicated at each location, the 4 phonemes can be indicated in one visual language. The 3×2 syllable clustering visual language information 219 can be transformed into various visual languages like 1×6 array 218 and 6×1 array 220.

Such multi-dimension visual language can be indicated with color lattices, saturation lattices, brightness lattices, figure and pattern when indicated on the image display unit or printed. The ordinary persons replace the input/output display unit with the one for the ordinary persons or connect the input/output display unit for the ordinary person thereto. Then the ordinary persons can read the alphabet into which the visual language was transformed.

Figure 6:
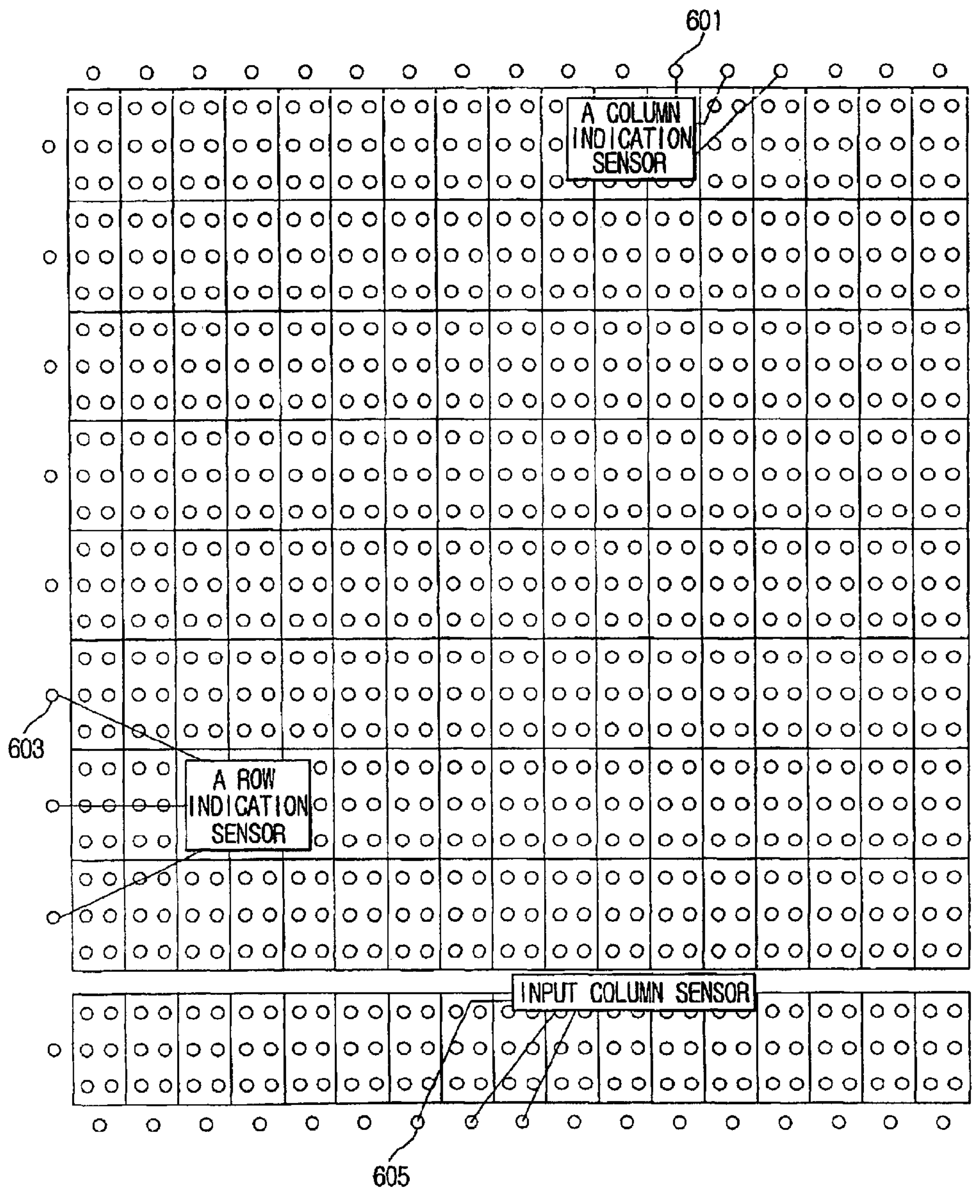
FIG. 6 shows a structure of a visual language transformation output unit according the preferable embodiment of the present invention.

FIG. 6 shows a structure of the visual language transformation output unit according the preferable embodiment of the present invention.

Referring to FIG. 6, the visual language transformation input/output unit is an apparatus for transforming the visual language on the book and the image display unit into the raised letters and outputting. The sensor at the top of the raised letters output is a column indication sensor 601 and the sensor at the left of the raised letters output is a row indication sensor 603, and the last line is an input column indication inspector 605.

The column sensor 601 perceives the column of the raised letters, and the row indication sensor 603 perceives the row of the raised letters.

The input column indication inspector 605 perceives the column being inputted at the present time.

Figure 7A:
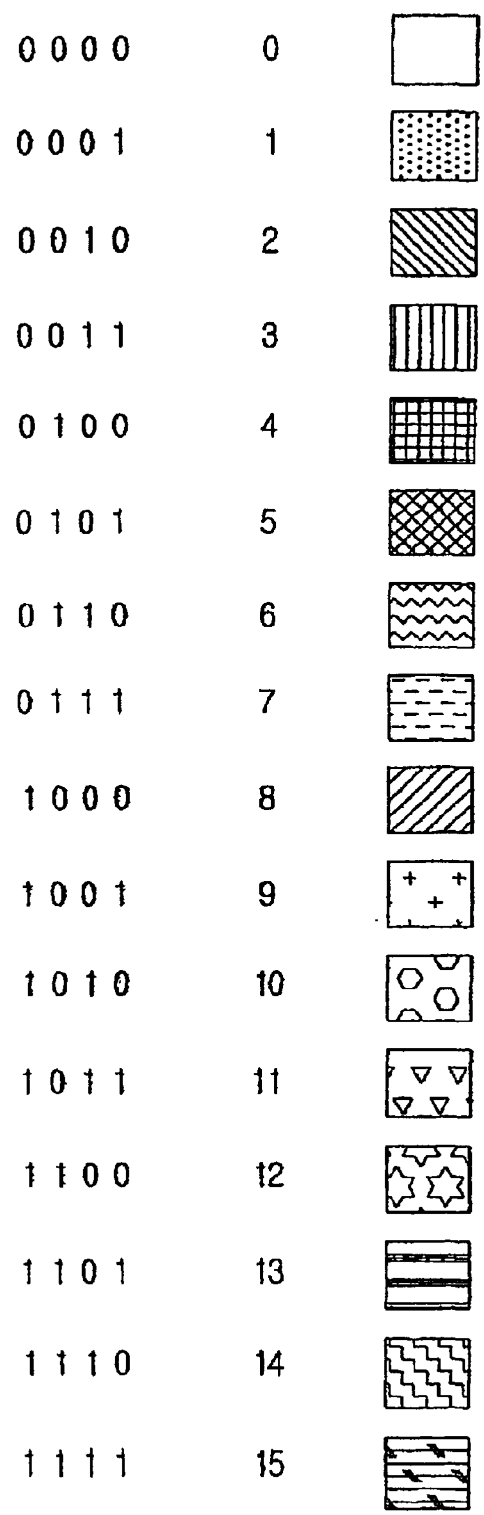
FIG. 7A shows an illustrated view of the indication of the visual language's syllable clustering to which the multi-dimension concept and the pattern lattice were applied according the preferable embodiment of the present invention.

FIG. 7A shows an illustrated view of the indications of the visual language's syllable clustering to which the multi-dimension concept and the pattern lattice were applied according the preferable embodiment of the present invention.

Referring to FIG. 7A, in the same method in FIG. 2A, each of the values 0 to 15 of the visual language which corresponds to 4-dimension based a visual language, is endowed with a characteristic color and in advance set up to embody the visual language of the present invention. Here the dimension or the color value can be differently set up.

Figure 7B:
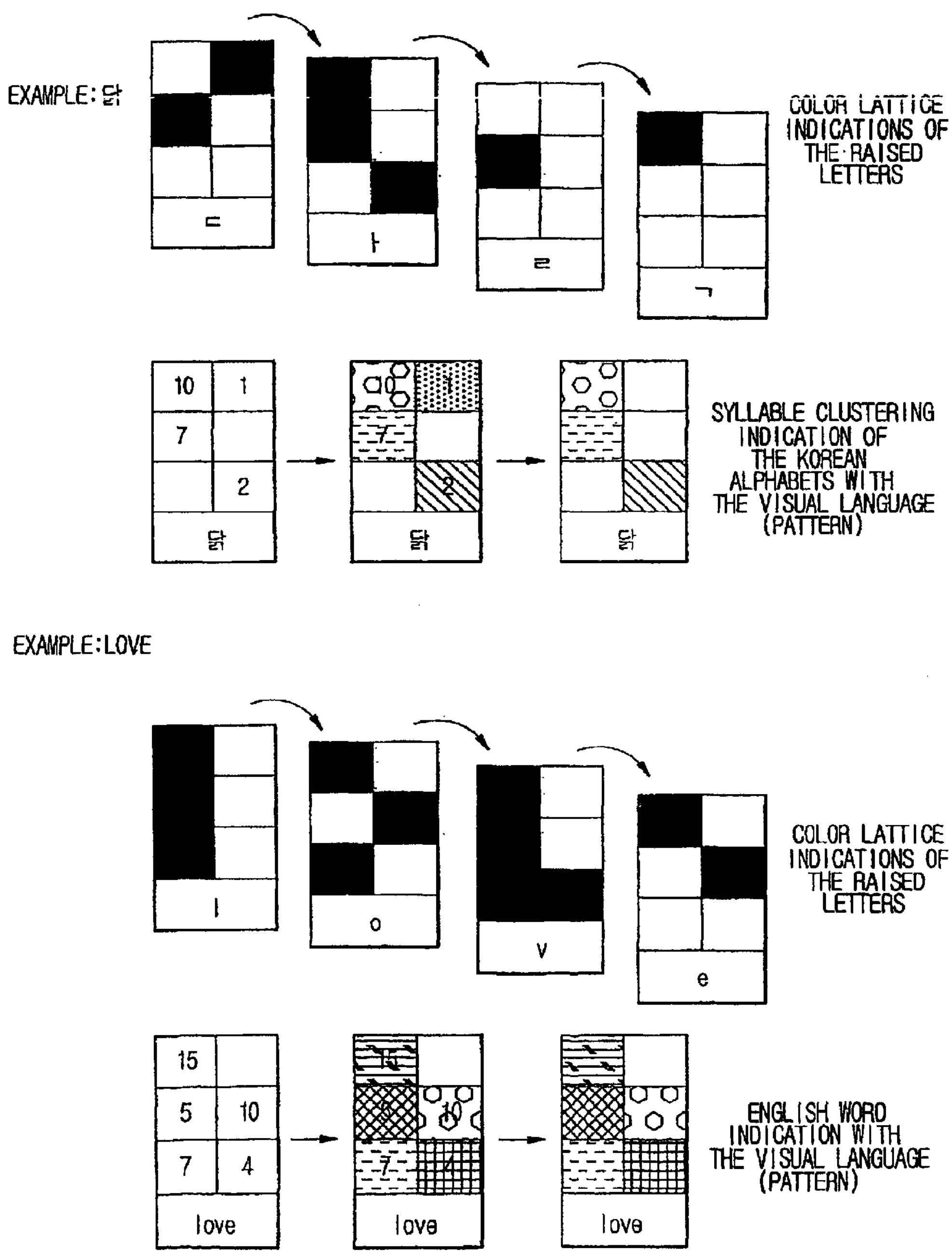
FIG. 7B shows an illustrated view of the visual language's 4-dimension usage pattern table according the preferable embodiment of the present invention.

FIG. 7B shows an illustrated view of the visual language's 4-dimension usage pattern table according the preferable embodiment of the present invention.

Referring to FIG. 7B, in the same method in FIG. 2B, if '닭' and 'love' is transformed into the linear arrangement visual language having the form of the color lattice indication of the raised letters and then the transformed visual language is indicated as pattern corresponding to each lattice according to the syllable clustering method, the 4 phonemes are indicated in one visual language.

Figure 8:
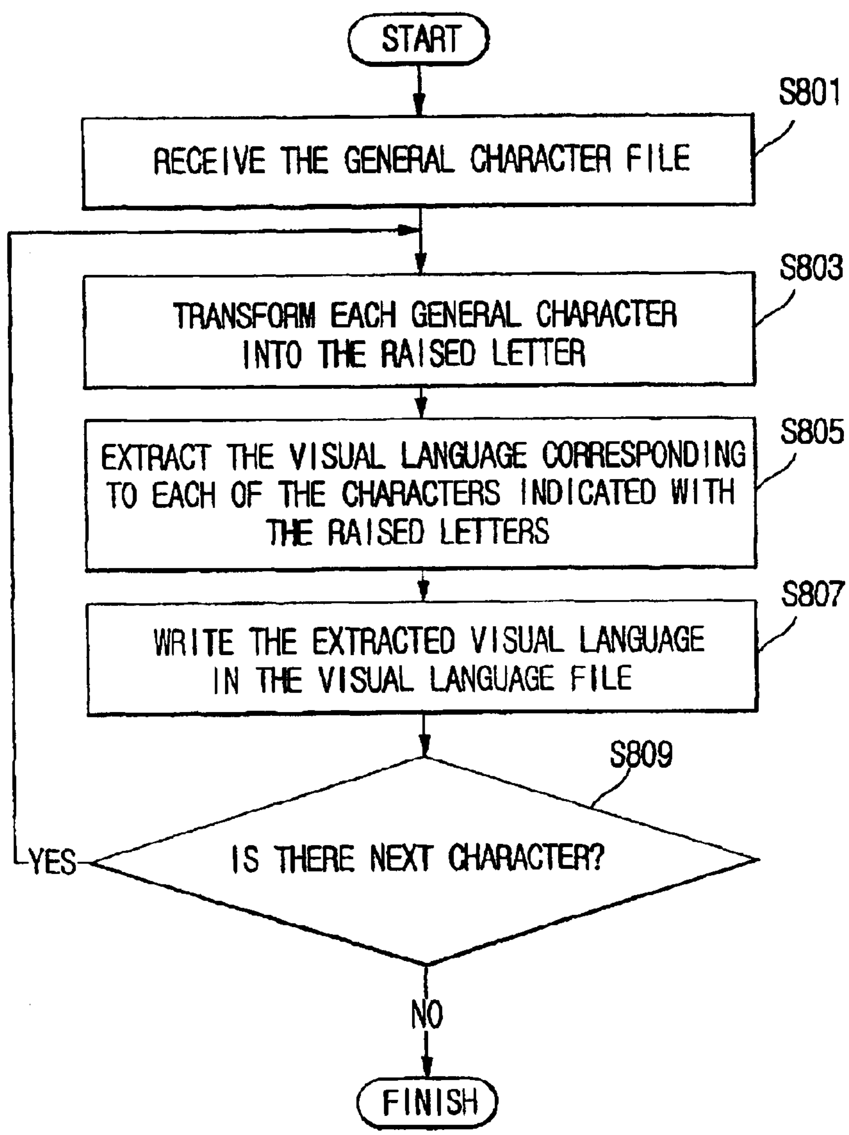
FIG. 8 is the flow chart illustrating the process of creating the visual language file by transforming a general language into a visual language according the preferable embodiment of the present invention.

FIG. 8 is the flow chart illustrating the process of creating the visual language file by transforming a general language into a visual language according the preferable embodiment of the present invention.

Referring to FIG. 8, if the general language receives the written file S801, each general language is transformed into the raised letters S803 and then into the linear arrangement visual language (not shown).

If the transformation into the linear arrangement visual language is made, the syllable clustering visual language corresponding to the character indicated in the linear arrangement visual language is extracted S805 and the visual language file is created (not shown), and the extracted visual language is written in the visual language file S807.

After deciding whether the next alphabet exits, if any alphabet exists, the process moves to S803 or if not, the process is completed.

Figure 9:
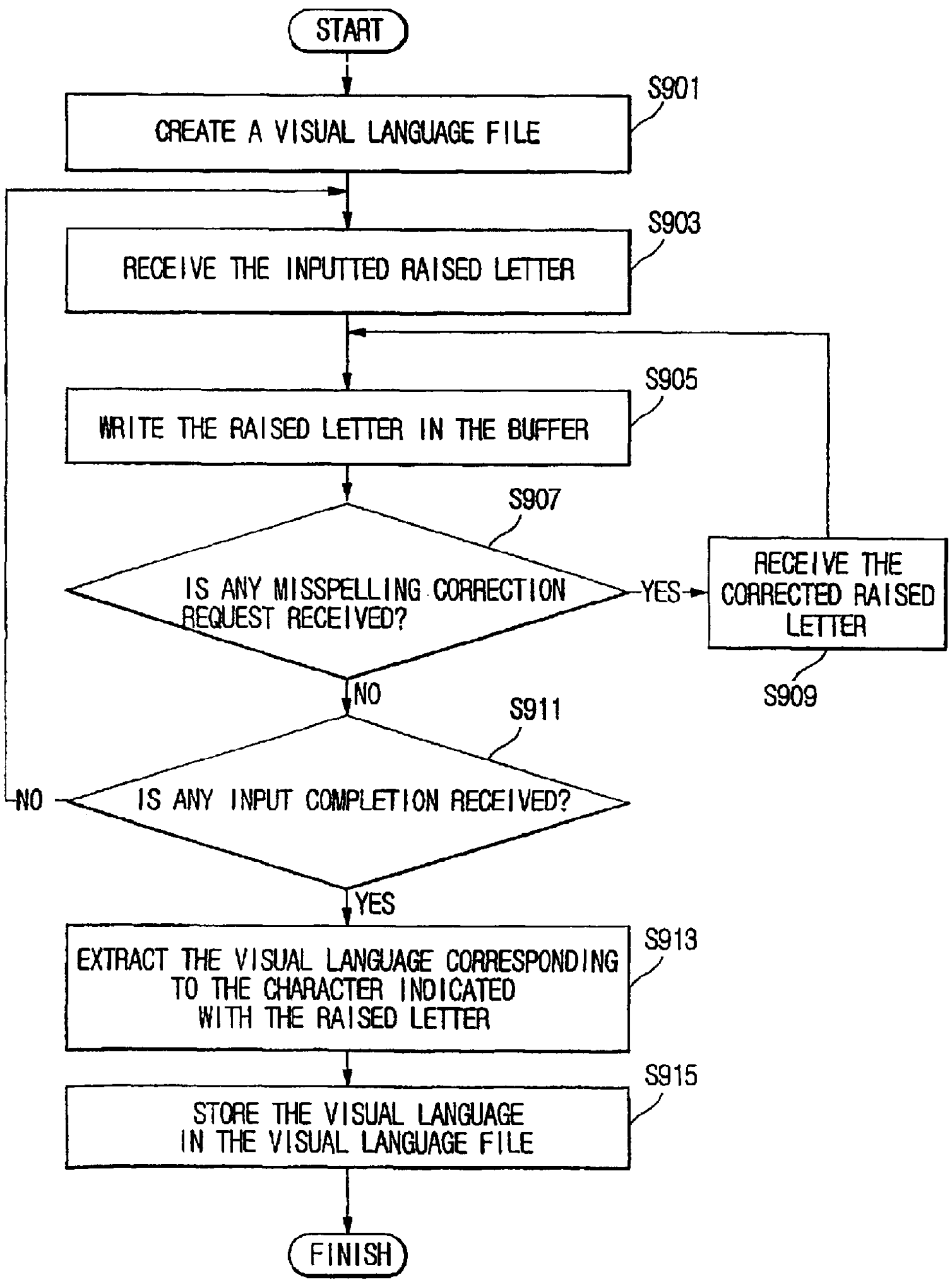
FIG. 9 is the flow chart illustrating the process of creating the visual language file by transforming a inputted raised letter into a visual language according the preferable embodiment of the present invention.

FIG. 9 is the flow chart illustrating the process of creating the visual language file by transforming the inputted raised letter into the visual language according the preferable embodiment of the present invention.

Referring to FIG. 9, the visual language file is created S901, and the inputted raised letter is received S903.

The received raised letter is written in the buffer S905, and the decision whether the misspelling correction request was received is made S907.

If the misspelling correction request was received as a result of the decision, the corrected raised letters is received S909, and then written in the buffer S905.

After the decision whether the input completion is received S911, the multiple raised letters are written in the buffer by repeating the above process until the input completion is received. If the input completion is received, each visual language corresponding to the character indicated as raised letter written in the buffer is extracted S913. And then the visual language is stored in the visual language file S915.

Figure 10:
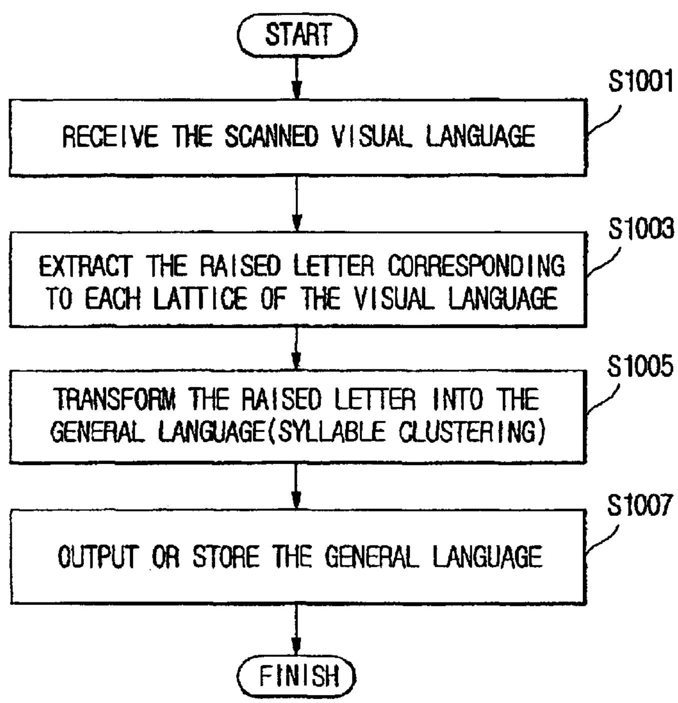
FIG. 10 is the flow chart illustrating the process of transforming the visual language into a general language according the preferable embodiment of the present invention.

FIG. 10 is the flow chart illustrating the process of transforming the visual language into the general language according the preferable embodiment of the present invention.

Referring to FIG. 10, the scanned visual language is received S1001, and the raised letter corresponding to each visual language lattice is extracted S1003.

After the extracted raised letters are transformed into the alphabet, the alphabet is outputted or stored S1007. Here, the alphabet is in the form of syllable clustering.

Figure 11:
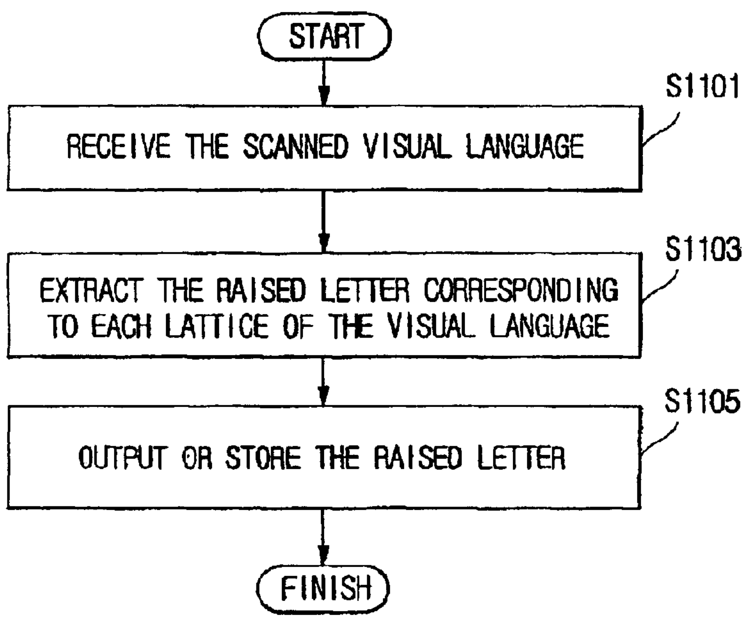
FIG. 11 is the flow chart illustrating the process of transforming a visual language into a raised letters according the preferable embodiment of the present invention.

FIG. 11 is the flow chart illustrating the process of transforming the visual language into the raised letters according the preferable embodiment of the present invention.

Referring to FIG. 11, if the scanned visual language is received S1101, the raised letters corresponding to each visual language lattice are extracted S1103. And then the raised letters are outputted or stored S1105.

Figure 12:
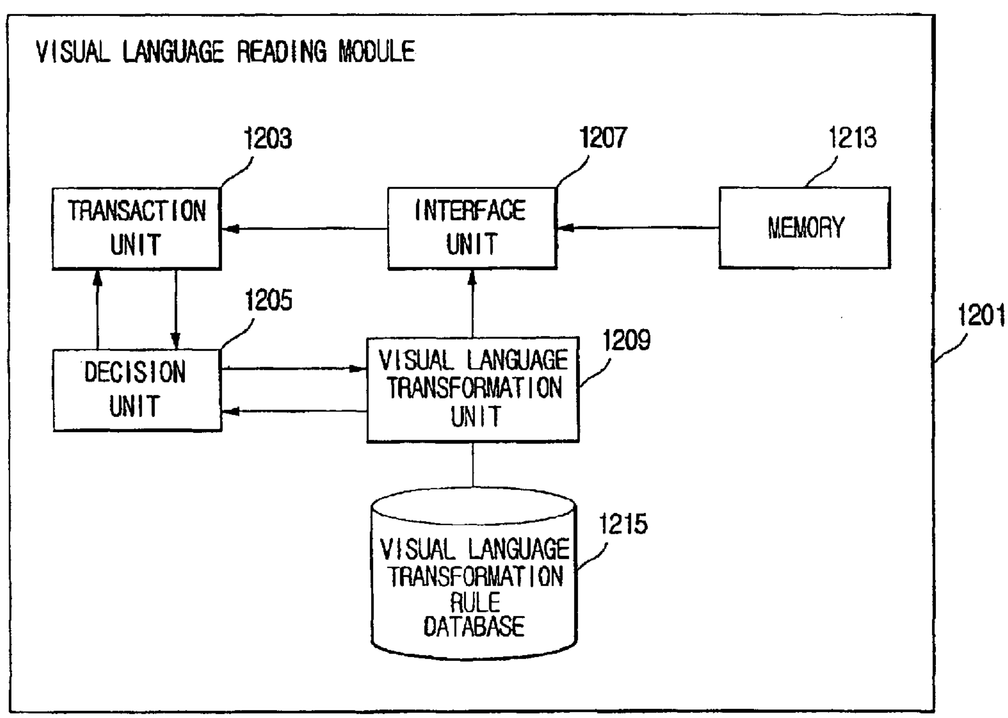
FIG. 12 is a block diagram of a visual language reading module according the preferable embodiment of the present invention.

FIG. 12 is a block diagram of a visual language reading module according the preferable embodiment of the present invention.

Referring to FIG. 12, the visual language reading module 1201 consists of a transaction unit 1203, a decision unit 1211, an interface unit 1207, a visual language processing unit 1209, a database processing unit 1211, and a memory 1213. And then the visual language reading module 1201 can comprise a visual language transformation rule database 1215.

The transaction unit 1203 can receive the raised letters, the alphabet and the visual language transformation request.

The decision unit 1205 can decide whether the raised letters, the alphabet and the visual language transferred from the transaction unit 1203 have error.

The interface unit 1207 can create the visual language input/output screen.

The visual language processing unit 1209 can decide the raised letters, the alphabet and the visual language transferred from the transaction unit 1203. Also, the visual language processing unit 1209 can extract the raised letters, the alphabet and the visual language corresponding to the raised letters, the alphabet and the visual language from the visual language transformation rule database 1215.

The memory 1213 can store the program information processed in the decision unit 1205 or the interface unit 1207.

The visual language transformation rule database 1215 can store the raised letters corresponding to the alphabet. Also, the visual language transformation rule database 1215 can store the visual language corresponding to the raised letters.

Figure 13:
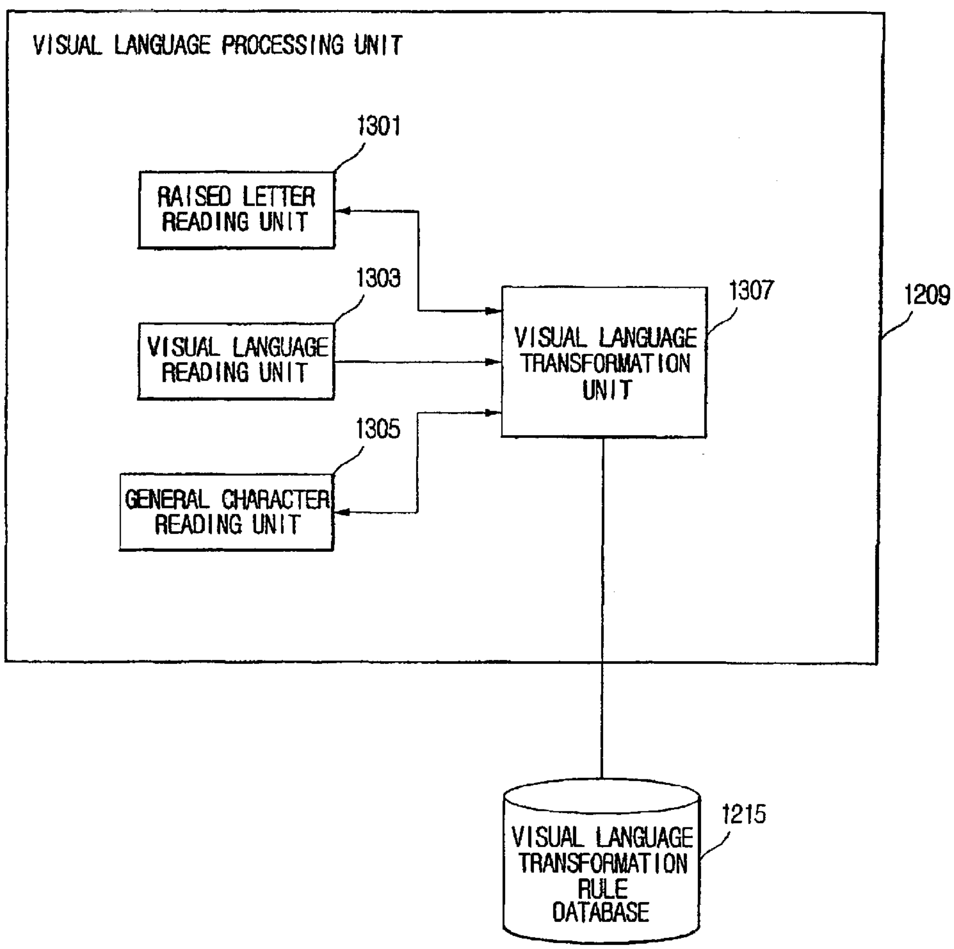
FIG. 13 is a block diagram of a visual language processing unit according the preferable embodiment of the present invention.

FIG. 13 is a block diagram of the visual language processing unit according the preferable embodiment of the present invention.

Referring to FIG. 13, the visual language processing unit 1209 consists of a raised letters reading unit 1301, a visual language reading unit 1303, an alphabet reading unit 1305 and a visual language transformation unit 1307.

The raised letters reading unit 1301 can read the raised letters transferred from the transaction unit 1203.

The visual language reading unit 1303 can read the visual language transferred from the transaction unit 1203.

The alphabet reading unit 1305 can read the alphabet transferred from the transaction unit 1203.

The visual language transformation unit can extract the raised letters, the alphabet and the visual language corresponding to the raised letters, the alphabet and the visual language from the visual language transformation rule database 1215.

Figure 14:
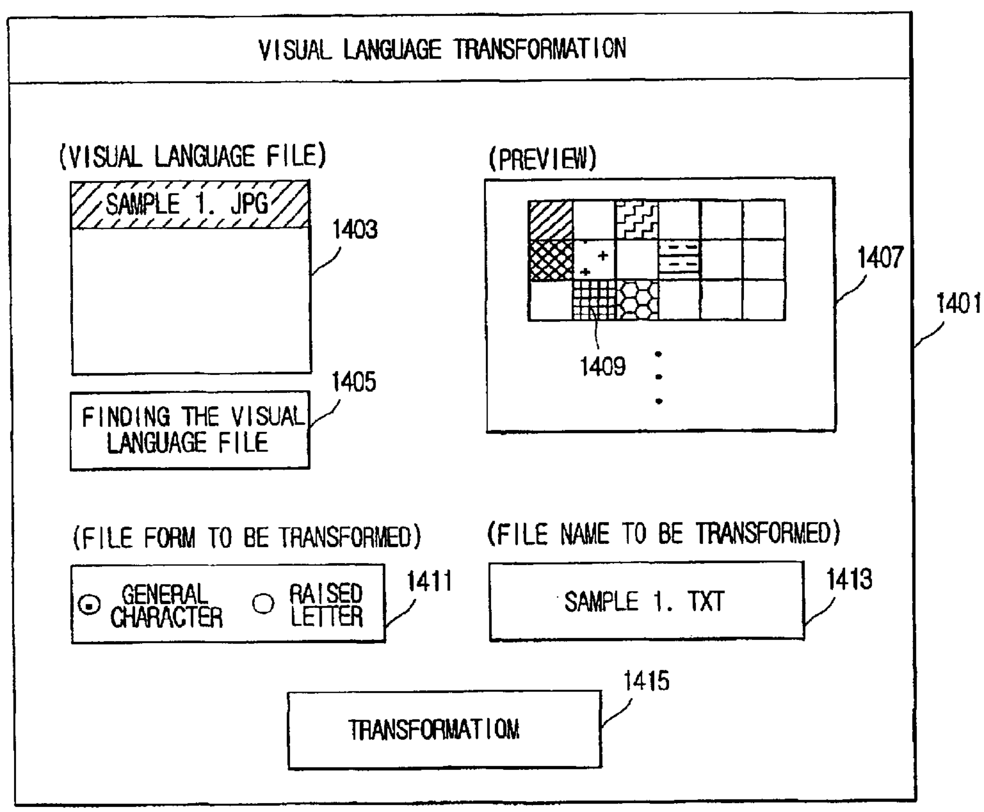
FIG. 14 shows the construction of the visual language transformation screen for transforming a visual language into the general language or a raised letters according the preferable embodiment of the present invention.

FIG. 14 shows the construction of a visual language transformation screen transforming a visual language into a general language or the raised letters according the preferable embodiment of the present invention.

Referring to FIG. 14, the visual language transformation screen 1401 consists of a selection visual language file part 1403, a visual language file finding button 1405, a preview part 1407, a transformation file form selection part 1411, a transformation file name input part 1413 and a transformation button 1415.

The selection visual language file part 1403 can select the visual language file to be transformed into the general language or the raised letters. Here, the visual language file can be image files scanned with the scanner or the digital camera.

The preview part 1407 can show the visual language image of the visual language file which was selected from the selection visual language file part 1403. The visual language image can include the lattice 1409 indicated with a color.

The transformation file form selection part 1411 can select the transformation file form into which the visual language file selected from the selection visual language file part 1403 will be transformed. The transformation file form can be the general language or the raised letters.

The file name to be transformed can be inputted with the transformation file name input part 1413

If the transformation button 1415 is pressed, the visual language file selected from selection visual language file part 1403 can be transformed into the transformation file form.

Figure 15:
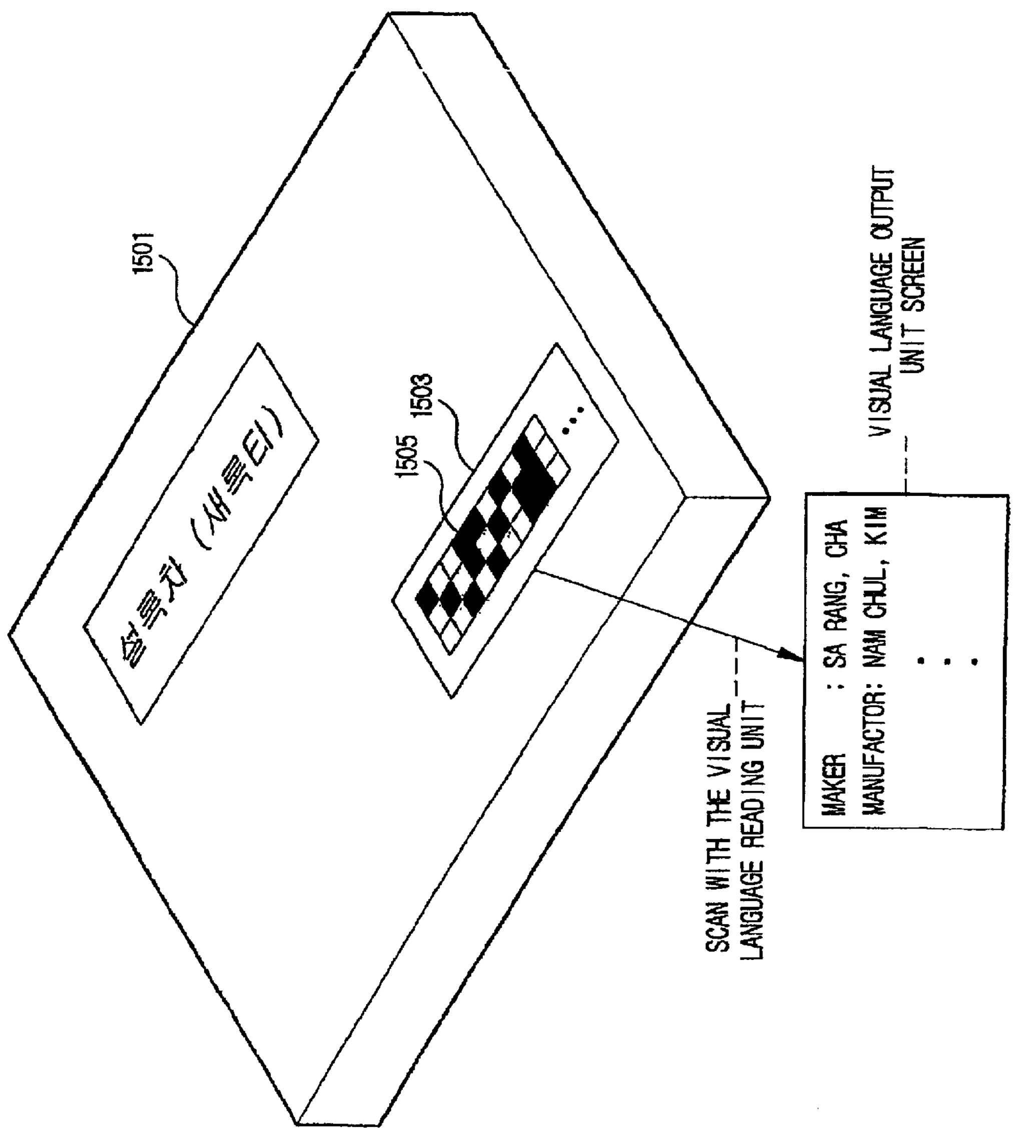
FIG. 15 shows a illustrated view of reading a visual language applied to the goods with the visual language reading unit and printing in the general language according the preferable embodiment of the present invention.

FIG. 15 shows a illustrated view of reading a visual language applied to the goods by using the visual language reading unit and printing in the general language according the preferable embodiment of the present invention.

Referring to FIG. 15, the various information including the maker, producer, the term of circulation, the material information and the release date of the goods can be indicated in the visual language instead of the barcode being used at the present.

In such way, in case that the visual language is indicated on the package of the goods, the information unopened to consumers before. Also, sellers can understand the contents indicated in the visual language by using the portable visual language input/output unit capable of reading the visual language. Here the visual language can indicate more various information than the previous barcode does, and is advantageous to decrease the written volume in the form of the syllable clustering comparing to the raised letters having the form of the previous linear arrangement.

It is evident that those skilled in the art may now make numerous uses and modifications of and departures form the specific embodiment described herein without departing from the inventive concept.

Industrial Applicability

As has been described above, the present invention can provide the multipurpose visual language system based on raised letter allowing the visually handicapped to effectively access all information on the industry by using the new visual language and system.

The visual language is easy to be optically read and translated, and with the characteristics of the multi-dimension and the syllable clustering, the amount of data storage can be enhanced. By transforming a general language into a visual language and printing, the volume of the printed book is less than that of the ordinary book, the visually handicapped can read the printed book by transforming a visual language with a visual language input/output unit. With the development of the broad usages of the visual language and the normal paper parallel print, the ordinary person can use the visual language. A raised letter input/output unit allows the visually handicapped to read and write at the same time, and read and write the contents needed at the same time.

Furthermore, it is advantageous when writing the education contents during education since the contents are written in the storing unit without noise and the contents being noiselessly written are confirmed. It is possible to replace the barcode in the industrial spot like a factory and a storehouse, to write the various contents of the goods, adhere and use them, and if the contents are encoded and adhered, since a decoder is needed to translate the encoded contents, it is possible to dually maintain the goods. Especially, the visual language parallel print doesn't almost claim extra cost and the visually handicapped can translate the content thereof with the cheap portable translator. For example, the visually handicapped receive favors of the closed caption by transforming the TV's closed caption with the raised letters transformation unit.

Furthermore, the present invention can provide the multipurpose visual language system based on the raised letters solving the problem of learning numerous acronyms, which are created by the bulky volume and the abuse of acronyms because of the linear arrangement of the raised letters, with the syllable clustering and the multi-dimension concept.

Furthermore, the present invention can provide the multipurpose visual language system based on the raised letters capable of directly translating since the visual language is extended from the previous raised letters.

Furthermore, the present invention can provide the multipurpose visual language system based on raised letters enabling the various commercial usages including encryption and its application.

Furthermore, the present invention can provide the multipurpose visual language system based on raised letter capable to translate with the raised letters output unit by using the useful multi-dimension concept of the extended raised letter in the field of information communication, the logistic maintenance and encryption as well as for the visually handicapped, to replace the previous barcode in everyday life and to provide the efficient method of enhancing the printing speed and correctness since numerous information indicated in the visual language included in one screen can be at once read.

Furthermore, the present invention can provide the visual language system serving as the meta-language to recognize the raised letters and the alphabet optically, wherein the visual language system can input/output, store the visual language and transform the visual language into other language and sound. Here the visual language can enhance the compatibility between media, which is applied to the print media and broadcasting media as language free to the medium, and information transfer speed and information transformation speed. Also, the visual language can be provided as the various dimension and structure (row and column) if the extension and the continuous usage are provided the visual language.

What is claimed is:

1. A method of processing information using Braille cells, comprising:

(a) receiving a plurality of Braille cell values that form one syllable or one word, wherein each Braille cell value comprises a 3×2 array of binary numerals, each binary numeral indicative of the presence or absence of an elevation, as would correspond to a physical world representation, at one selected location within the array;

(b) selecting a common location in the array that forms each Braille cell value;

(c) combining the binary numerals at the common location for all Braille cell values; and (d) repeating (b) and (c) for each array location so as to form a set of combined Braille values comprising an array of six numerals.

2. The method of claim 1, further comprising: converting the array of six numerals into six items of visual data, respectively such that each visual data item is related to the six numerals, respectively; and storing the six visual data items.

3. The method of claim 2, further comprising displaying the six visual data items.

4. The method of claim 2, further comprising storing information representing the relationship between visual data and numerals, wherein the converting is performed based on the stored relationship information.

5. The method of claim 2, wherein the visual data comprises one of the following: color, brightness, pattern, saturation, and design.

6. The method of claim 5, wherein the visual data comprises a combination of at least two of color, brightness, pattern, saturation, and design.

7. The method of claim 1, before receiving, further comprising:

receiving a plurality of alphabet inputs that form one syllable or one word; and converting the received alphabet inputs into the plurality of Braille cell values according to a standard Braille cell format.

8. The method of claim 1, further comprising storing the set of combined Braille values.

9. The method of claim 1, wherein each of the six numerals is displayable as a decimal numeral.

10. The method of claim 1, wherein the receiving comprises receiving the plurality of Braille cell values from a Braille cell input device.

11. A method of storing information using Braille cells, comprising:

(a) receiving a plurality of Braille cell values that form one syllable or one word, wherein each Braille cell value comprises a 3×2 array of binary numerals, each binary numeral indicative of the presence or absence of an elevation, as would correspond to a physical world representation, at one selected location within the array;

(b) selecting a common location in the array that forms each Braille cell value;

(c) combining the binary numerals at the common location for all Braille cell values;

(d) repeating (b) and (c) for each array location so as to form a set of combined Braille values comprising an array of six numerals;

(e) converting the array of six numerals into six items of visual data, respectively, such that each visual data item is related to the six numerals, respectively; and (f) storing the six visual data items.

12. The method of claim 11, wherein the visual data comprises at least one of the following: color, brightness, pattern, saturation, and design.

13. The method of claim 11, further comprising encrypting the six visual data items before the storing.

14. A method of processing visual data, comprising:

recognizing at least six items of visual data;

converting the at least six visual data items into at least an array of six numerals;

converting each of the six numerals into a set of binary numerals, respectively, so as to obtain six sets of binary numerals, wherein each set of binary numerals has at least two digits;

selecting one binary numeral from each set of binary numerals for the same digits, respectively, so as to obtain a plurality of 3×2 arrays of binary numerals, wherein each array contains at least one of each binary state; and converting each of the plurality of 3×2 arrays of binary numerals into an alphanumeric character, respectively, based on a standard Braille cell format so as to provide at least one syllable or one word.

15. The method of claim 14, wherein the alphanumeric character comprises different alphabets.

16. The method of claim 14, wherein the recognizing comprises scanning the at least six visual data items.

17. The method of claim 14, further comprising storing information representing the relationship between visual data and numerals, wherein the converting the at least six visual data items is performed according to the stored relationship information.

18. The method of claim 14, wherein the visual data comprises at least one of the following: color, brightness, pattern, saturation, design and a combination thereof.

19. The method of claim 14, further comprising displaying the at least one syllable or one word.

20. The method of claim 14, further comprising providing Braille cell outputs corresponding to the plurality of 3×2 arrays of binary numerals via a Braille cell output device.

21. The method of claim 14, wherein the array of six numerals is represented by one of the following arrays: a 3×2 array, a 6×1 array, or a 1×6 array.

22. An apparatus for storing information using Braille cells, comprising:

a Braille cell receiving unit configured to receive a plurality of Braille cell values that form one syllable or one word, wherein each Braille cell value comprises a 3×2 array of binary numerals, each binary numeral indicative of the presence or absence of an elevation, as would correspond to a physical world representation, at one selected location within the array;

a combining section configured to i) select a common location in the array that forms each Braille cell value, to ii) combine the binary numerals at the common location for all Braille cell values and to repeat i) and ii) for each array location so as to form a set of combined Braille value comprising an array of six numerals;

a visual language conversion unit configured to convert the array of six numerals into six items of visual data, respectively, such that each visual data item is related to the six numerals, respectively; and a memory configured to store the six visual data items.

23. The apparatus of claim 22, further comprising a database configured to store information representing the relationship between visual data and numerals, wherein the visual language conversion unit performs the conversion based on the relationship information of the database.

24. An apparatus for processing information using Braille cells, comprising:

means for receiving a plurality of Braille cell values that form one syllable or one word, wherein each Braille cell value comprises a 3×2 array of binary numerals, each binary numeral indicative of the presence or absence of an elevation, as would correspond to a physical world representation, at one selected location within the array;

means for selecting a common location in the array that forms each Braille cell value;

means for combining the binary numerals at the common location for all Braille cell values; and means for repeating the selecting and the combining for each array location so as to form a set of combined Braille values comprising an array of six numerals.

* * * * *